US009875594B2

(12) United States Patent
Knudson

(10) Patent No.: US 9,875,594 B2
(45) Date of Patent: Jan. 23, 2018

(54) BANKNOTE VALIDATOR

(71) Applicant: MEI, Inc., Malvern, PA (US)

(72) Inventor: Garry M. Knudson, Exton, PA (US)

(73) Assignee: Crane Payment Innovations, Inc., Malvern, PA (US)

( * ) Notice: Subject to any disclaimer, the term of this patent is extended or adjusted under 35 U.S.C. 154(b) by 79 days.

(21) Appl. No.: 14/182,437

(22) Filed: Feb. 18, 2014

(65) Prior Publication Data

US 2014/0231214 A1 Aug. 21, 2014

Related U.S. Application Data

(60) Provisional application No. 61/766,869, filed on Feb. 20, 2013.

(51) Int. Cl.
*G07D 7/00* (2016.01)
*G06K 7/00* (2006.01)
(Continued)

(52) U.S. Cl.
CPC ................. *G07D 7/00* (2013.01); *G07D 7/16* (2013.01); *G07D 7/162* (2013.01);
(Continued)

(58) Field of Classification Search
CPC .......... G07D 7/16; G07D 7/162; G07D 7/164; G07D 7/17; G07D 7/181; G07D 7/122; G07D 7/00; G07D 7/04; G07D 11/0036; G07D 11/0039; G07D 11/0048; G03G 15/5025; G03G 15/607; G03G 2215/00324; G03G 15/60; G03G 15/602; H04N 1/00702; H04N 1/00705; H04N 1/00718; H04N 1/00721; H04N 1/0057; H04N 1/00602; H04N 1/12; G06Q 10/06; G06Q 20/10; G06Q 30/08; G06Q 40/00; G06Q 40/02; G06Q 40/04; G06Q 40/06; G06Q 20/108; G06Q 20/204; G06Q 40/025
(Continued)

(56) References Cited

U.S. PATENT DOCUMENTS 4,356,473 A * 10/1982 Freudenthal ............. G07D 7/04 235/436
4,367,045 A * 1/1983 Grosvernier ............. B65H 9/00 250/559.37
(Continued)

FOREIGN PATENT DOCUMENTS

DE 102010055700 * 6/2012 ............. G07D 7/162
EP 0206675 A2 12/1986

OTHER PUBLICATIONS

English Translation of DE 102010055700 A1.*

*Primary Examiner* — Jeffrey Shapiro

(57) ABSTRACT

A sensing system is described herein. The sensing system includes a sampling module configured to define a sampling interval. The sensing system also includes a plurality of sensors to sample an inserted item based at least on the sampling interval. The sensing system includes a tracking module configured to obtain start sensor data from the sensors, determine if start sensor data is absent, increment an absence count based at least on the determination, compare the absence count with a threshold absence count, and reject the inserted item based at least on the comparison.

19 Claims, 5 Drawing Sheets

(51) Int. Cl.

| | |
|---|---|
| ***G06K 9/00*** | (2006.01) |
| ***G07D 7/16*** | (2016.01) |
| ***G07D 11/00*** | (2006.01) |
| ***G07D 7/162*** | (2016.01) |
| ***G07F 7/04*** | (2006.01) |

(52) U.S. Cl.
CPC ..... *G07D 11/0036* (2013.01); *G07D 11/0039* (2013.01); *G07F 7/04* (2013.01)

(58) Field of Classification Search
USPC ......... 194/206, 207, 200; 209/534; 382/135, 382/136; 235/379; 705/35, 39, 41–45; 271/256, 226, 229, 230, 234, 245, 248, 271/3.13, 3.15, 3.17, 4.02, 4.03, 265.01, 271/265.02, 10.01, 10.02, 10.03, 3.06, 271/3.09; 399/367, 370, 371
See application file for complete search history.

(56) References Cited

U.S. PATENT DOCUMENTS 4,511,136 A * 4/1985 Yamada ................ B65H 29/40 271/187
5,363,949 A * 11/1994 Matsubayashi .......... G07D 7/20 194/206
5,465,821 A * 11/1995 Akioka .................... G07D 7/12 194/207
5,651,443 A 7/1997 Gaudette
6,483,095 B1 * 11/2002 Iwaki ....................... G07D 7/12 250/205
6,493,461 B1 * 12/2002 Mennie .................. G07D 7/162 382/135
6,605,819 B2 * 8/2003 Ross ...................... G07D 7/122 250/239
2002/0066125 A1 5/2002 Mukai
2005/0207634 A1 * 9/2005 Jones et al. ................... 382/135
2008/0273789 A1 * 11/2008 Bell ....................... G07D 7/168 382/137
2010/0060881 A1 * 3/2010 Kayani .......................... 356/72
2010/0073711 A1 * 3/2010 Pellaton et al. ............. 358/1.15
2011/0052085 A1 * 3/2011 Ikari ........................ G07D 7/12 382/224
2011/0290617 A1 * 12/2011 Kwak ................. G06Q 20/042 194/334
2012/0119436 A1 * 5/2012 Morita ..................... B65H 7/14 271/259

* cited by examiner

BANKNOTE VALIDATOR

RELATED APPLICATIONS

This application claims priority to U.S. Provisional Application No. 61/766,869, filed Feb. 20, 2013, the entire contents of which are hereby incorporated by reference in its entirety.

TECHNICAL FIELD

The present subject matter relates, in general, to detection of non-banknote items and, in particular, to a method and a system to detect non-banknote items, such as credit or debit cards, inserted into electronic transaction systems, such as currency validator, automatic teller machine, gaming machine, and vending machine.

BACKGROUND

Electronic transaction systems, such as automatic ticket seller machine, automatic teller machine, vending machine and other kiosks are provided at unattended places to provide ease and flexibility to a user to perform transactions in return for goods or services. As some of these electronic transaction systems are not well monitored, a banknote validator is often installed in such machines to prevent acceptance of suspect counterfeit banknotes. The banknote validator includes one or more sensors to reject items that are not recognized as legitimate banknotes. Besides suspect banknotes, users may inadvertently insert non-banknote items, such as credit cards, etc., into the banknote validator. However, since the banknote validators are not made to accept non-banknote items, such items tend to get jammed in the passageway thereby making the system inoperative. Additionally, a user may need the assistance of an operator to release the credit card, however, an operator may not always be readily accessible.

SUMMARY

This summary is provided to introduce concepts related to a system and method to detect non-banknote items, such as credit cards, inserted into systems that are designed to accept banknotes. Examples of non-banknote items include, but are not limited to, credit cards, debit cards, loyalty cards, bank cards, membership cards, identification cards, tickets, receipts, security papers, checks, coupons, or in general any document that is dimensionally different from a banknote or bill.

The concepts are further described below in the detailed description, drawings and claims. This summary is not intended to identify essential features of the claimed subject matter nor is it intended for use in determining or limiting the scope of the claimed subject matter.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

In an implementation, a sensing system includes a sampling module configured to define a sampling interval, and a plurality of sensors to sample an inserted item based at least on the sampling interval. The sensors are at least one of start sensors and recognition sensors. The sensing system further includes a tracking module configured to obtain start sensor data from the sensors, determine if start sensor data is absent, increment an absence count based at least on the determination, compare the absence count with a threshold absence count, and reject the inserted item based at least on the comparison.

In another implementation, the tracking module further compares a sample count to a threshold sample count, and rejects the inserted item if the sample count exceeds the threshold value. The tracking module is configured to obtain recognition sensor data from the recognition sensors. Further, the tracking module determines whether the inserted item is a valid banknote based at least on recognition sensor data. Examples of rejected items include, but are not limited to, credit cards, debit cards, loyalty cards, bank cards, membership cards, identification cards, tickets, receipts, or any other item which the banknote validator has not been designed to accept. The sensing system can be implemented in various types of unattended payment machines. Examples of an unattended payment machine include, but are not limited to, vending machines, kiosks, automated teller machines, gaming machines, parking kiosks, ticketing machines, currency validators, banknote validators, or any other device configured to accept currency from a user in exchange for goods or services.

In another implementation, a method comprises receiving an item, wherein the item is at least one of a non-banknote item and a banknote, obtaining start sensor data from at least one start sensor by sampling the start sensor at predetermined sampling intervals, in response to the received item. The method further includes determining whether start sensor data is absent, if the start sensor data is absent, incrementing an absence count, comparing the absence count with a threshold absent count, and rejecting the item as a non-banknote item based at least on the comparison.

In another implementation, the method further includes storing the start sensor data if the start sensor data is present, and evaluating the start sensor data to determine, in part, validity of an inserted banknote.

The method can further include obtaining recognition sensor data from at least one recognition sensor by sampling the item at predetermined sampling intervals. The recognition sensor data can be used to determine, in part, validity of the inserted banknote.

The method can further include incrementing a sample count if at least one of the start sensors and recognition sensors are sampled, and comparing the sample count with a threshold sample count, and rejecting the inserted item based at least on the comparison. The method can be implemented in one of a vending machine, an automatic teller machine, a gaming machine, a currency validator, a pay phone, a computer, and a hand-held device. In an example implementation, the threshold absence count is 5 and the threshold sample count is 10.

In an implementation, a method includes obtaining one or more samples from a plurality of sensors, in response to an inserted item, analyzing a predetermined number of samples to determine whether data is absent in the samples, comparing a number of times data is absent with a predetermined value, and rejecting the inserted item based on the comparing. The predetermined number of samples is 10 and the predetermined value is 5. A system implementing the method mentioned above.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components. For simplicity and clarity of illustration, elements in the figures are not necessarily to scale.

DETAILED DESCRIPTION

Figure 1:
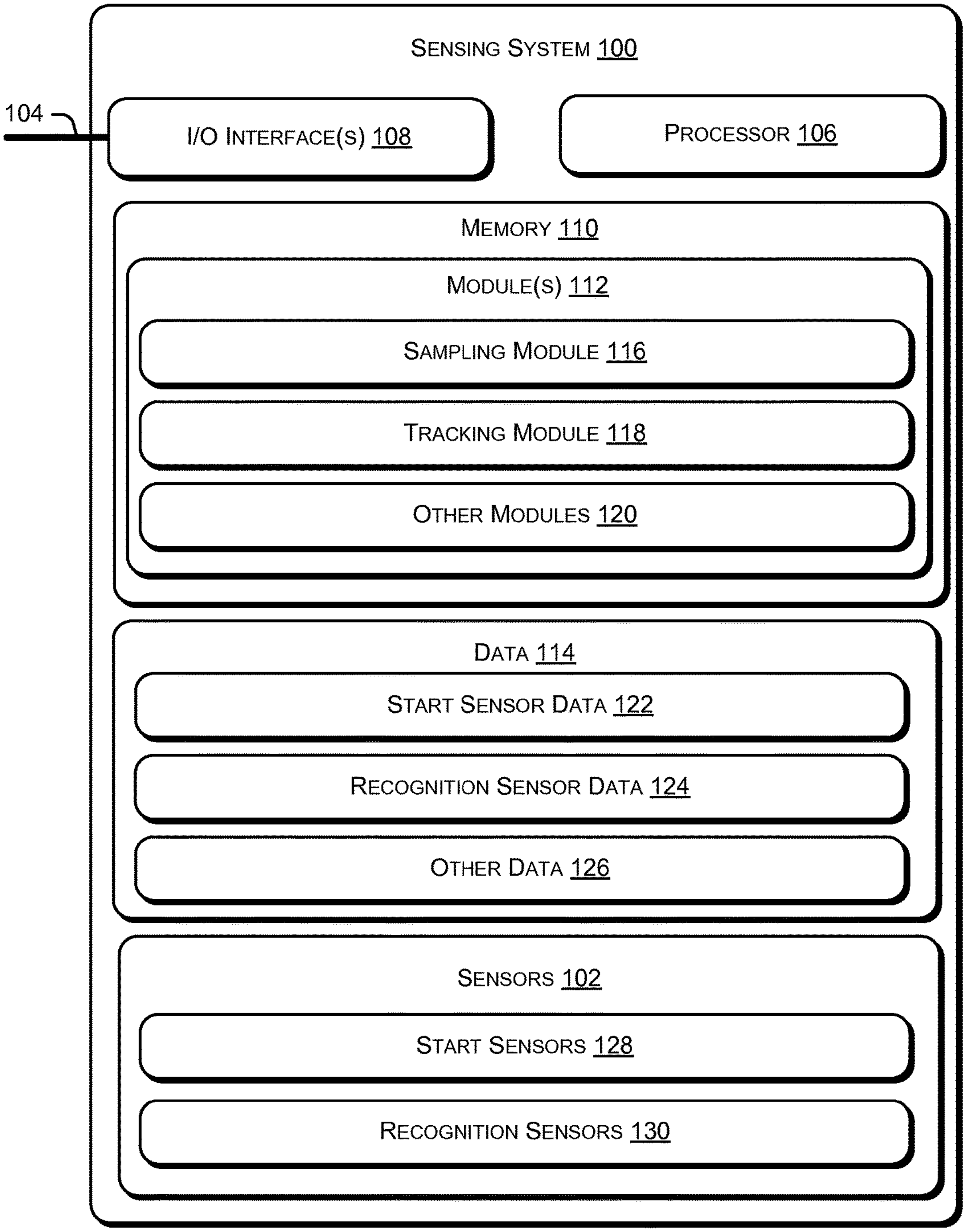
FIG. 1 illustrates a sensing system having one or more sensors, according to an implementation of the present subject matter.

A sensing system configured to detect non-banknote items is disclosed herein. The sensing system can be implemented within any electronic transaction system, such as a vending machine, a gaming machine, an automatic teller machine, a pay phone, etc., and in general any equipment used in retail, gaming, or banking industry. Examples of non-banknote items include, but are not limited to, credit cards, debit cards, loyalty cards, bank cards, membership cards, identification cards, tickets, receipts, security papers, checks, coupons, or in general any document that is dimensionally different from a banknote or bill.

Any item of value, such as a banknote, is generally transported within an electronic transaction system along a transport path. For example, the banknote may be transported from an inlet of a banknote validator to a storage component along the transport path. Typically, the banknote is transported past a plurality of sensors, such as start sensors and recognition sensors, to track progress and validate genuineness of the banknote.

Typically, start sensors determine whether any item, such as an item in the form of a bill or a banknote, is received from a user. The start sensors include one or more light sources to emit light at a number of wavelengths in a short period of time, which when blocked helps determine whether or not an item is present. In a similar manner, the recognition sensors are also configured to obtain data samples to check the validity of the received item, for example with respect to pre-stored data. Conventionally, vast amounts of data are collected by the start and recognition sensors. Such data is then processed after the item has passed through all the sensors. Based on the post-processing of the data, it is determined whether the item is a valid banknote or not. Accordingly; the item is either accepted or rejected. Rejected items are dispensed back to the user (e.g. by reversing the transport direction). However, the item may have reached a point along the transport path where returning the item may be mechanically difficult, especially if the item has different material and physical properties as compared to that of a genuine banknote, for example in the case of a credit card. In such situations, the item may become jammed in the transport path and prevent further operation of the device.

It should be noted that the systems designed for bills or banknotes are not mechanically designed to handle high rejections rates. For example, one or more rollers are provided to ease the insertion of a banknote from the inlet of the sensing system to the various units within the electronic transaction system, such as one-way storage containers or two-way storage containers, or both, etc. The mechanical design of the rollers that enable such forward motion and the construction of the transport path are not typically designed to minimize jamming of items transported in a reverse direction when compared to the insertion direction. The jamming probability is particularly pronounced for certain non-banknote items, such as credit cards that have text engravings. Thus, it has been observed that the insertion of non-banknote items or unfit banknotes increases the probability of rejection rates and jams.

To this end, the implementations provided herein describe a system and method to differentiate between items, such as banknotes, and non-banknote items. The non-banknote item, generically speaking, is any item that is dimensionally different from a banknote or bill that the system was designed to accept. Further, such intelligent determination between banknotes and non-banknote items is intended to be made as early as possible so that rejection minimizes the risk of non-banknote items becoming jammed in the device. The implementations are hereinafter described with reference to banknotes or bills, however, other implementations are possible as would be understood by a person skilled in the art.

In an embodiment, an exemplary sensing system having a plurality of sensors, such as start sensors and recognition sensors, are placed along the transport path to track the progress and validity of the banknote. The plurality of start sensors are placed such that if a banknote is inserted, both the start sensors are covered at all times. However, if a non-banknote item (e.g. an item having dimensions less than acceptable banknote) is inserted, the non-banknote item is likely to leave one or more start sensors uncovered over a period of time.

Thus, in an implementation, a sampling module samples the start sensors after an item is inserted. Start sensors obtain start sensor data in response to the inserted item. Sampling module stores the start sensor data, which is then analyzed by a tracking module. For example, the tracking module may analyze the start sensor data in real-time as and when the start sensor data is received. After the first reading, the tracking module analyzes the start sensor data to determine the number of times start sensor data is absent. This, in turn, indicates the number of times the start sensors were uncovered by the inserted item. Thus, the tracking module increments a variable called absence count based on each sample with missing start sensor data. Furthermore, the tracking module compares the absence count with a threshold absence count. If the comparison yields that the absence count is equal to or more than the threshold absence count, the item is deemed a non-banknote item and immediately rejected and returned back to user. The tracking module may also take into consideration sample count, along with absence count. Sample count is defined as the number of samples at any time. To ensure early detection of non-banknote items, the sampling module may determine a threshold sample count to be monitored along with the absence count.

In conventional systems, sensors would treat the non-banknote item as a banknote and continue to take start sensor data and recognition sensor data until the banknote has passed through all the sensors. Traditionally, the entire data is then processed and determination of whether the item should be rejected or not is made. In such conventional systems, the non-banknote item will have been transported along the transport path past all of the sensors, thus increasing the risk of non-banknote items becoming jammed within the device. To overcome this, implementations described in the present subject matter allow for early detection of non-banknote items that should not have been inserted in the first place. Further, the non-banknote item can now be returned to the user without the need of operator assistance. Also, the analysis steps related to validity of the item need not be executed for non-banknote items, thus saving computational time and resources.

It will be appreciated that the implementations described herein can be used in a standalone unit, or for incorporation into a conventional electronic transaction system that implements a sensing system for banknotes. Additional sensing units may be implemented to determine authenticity of the banknote as will be understood by a person skilled in the art.

While aspects of the described detection of non-banknote items can be implemented in any number of different systems, environments, and/or configurations, the embodiments are described in the context of the following exemplary system(s). The descriptions and details of well-known components are omitted for simplicity of the description. It will be appreciated by those skilled in the art that the words during, while, and when as used herein are not exact terms that mean an action takes place instantly upon an initiating action but that there may be some small but reasonable delay, such as a propagation delay, between the initial action, and the reaction that is initiated by the initial action. In addition, the term bill and banknote has been used interchangeably.

FIG. 1 illustrates a sensing system 100 having one or more sensors 102, according to an implementation of the present subject matter. The sensing system 100 can be implemented within an automatic transaction machine (ATM), a gaming machine, a kiosk, a banknote acceptor, a vending machine, or any other device configured to accept currency.

In one implementation, sensing system 100 is configured to allow insertion of selected items 104, such as banknotes, and reject insertion of non-banknote advertently or inadvertently inserted by a user. Thus, the term "item" is employed to mean any valid or counterfeit banknote or a non-banknote item such as token, coin, coupon, document, credit card, debit card, loyalty card, bank card, membership card, identification card, ticket, receipt, security document, check, etc. Furthermore, sensing system 100 can be any hardware or software or any combination thereof, which may be configured to detect insertion of a selected item from amongst items 104 mentioned above. For clarity and better understanding, consider a sensing system 100 configured to detect and accept banknotes while also configured to detect one or more non-banknote items, such as credit cards, from amongst items 104 inserted into the system 100, and subsequently reject the non-banknote items 104. Even though the description hereinafter is with reference to banknotes as acceptable items 104, it will be understood that the methods and systems described herein can be readily adapted for use with other items as well.

In one implementation, the detection of a non-banknote item, from amongst items 104, includes a determination of whether a non-banknote item is inserted as item 104 and if such an item is inserted, reject the non-banknote item. However, if the item 104 is a banknote for which the device is design to accept, a further determination of whether the item 104 is an acceptable banknote is made.

In an implementation, sensing system 100 includes a processor 106, interface(s) 108, and a memory 110 coupled to the processor 106. The processor 106 can be a single processing unit or a number of units, all of which could also include multiple computing units. The processor 106 may be implemented as one or more microprocessors, microcomputers, microcontrollers, digital signal processors, central processing units, state machines, logic circuitries, and/or any devices that manipulate signals based on operational instructions. Among other capabilities, the processor 106 is configured to fetch and execute computer-readable instructions and data stored in the memory 110.

Interface(s) 108 may include a variety of software and hardware interfaces, for example, interface for peripheral device(s), such as a keyboard, a mouse, an external memory, camera, and a printer. Further, interface 108 includes an input for receiving one or more items 104. Additionally, sensing system 100 may include an output for ejecting items 104. Optionally, the interface 108 may include may be a combined input-output unit for receiving and ejecting items 104.

Memory 110 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 110 also includes module(s) 112 and data 114.

Module(s) 112 can include routines, programs, objects, components, data structures, etc., which perform particular tasks or implement particular abstract data types. In one implementation, the module(s) 112 include a sampling module 116, a tracking module 118, and other module(s) 120. It will be appreciated that each of the module(s) 112 can be implemented as a combination of one or more different modules. Other module(s) 120 include programs that supplement applications or functions performed by sensing system 100. Data 114 serves, amongst other things, as repository for storing data pertinent to functioning of modules 112. Data 114 includes start sensor data 122, recognition sensor data 124, and other data 126.

In an implementation, sensing system 100 also includes sensors 102, such as start sensor(s) 128 and recognition sensor(s) 130. In an implementation, start sensors 128 are operable to sense whether an item 104 is received from a user via the I/O interface 108, based on start sensor data 122. On the other hand, recognition sensors 130 capture recognition sensor data 124 pertaining to material properties and other such variables to determine whether the item 104 is acceptable valid banknote or not. In an example, start sensors 128 and recognition sensors 130 are separated by a distance "d". An example implementation of sensors 102 is illustrated in FIGS. 2 and 3.

Figure 2:
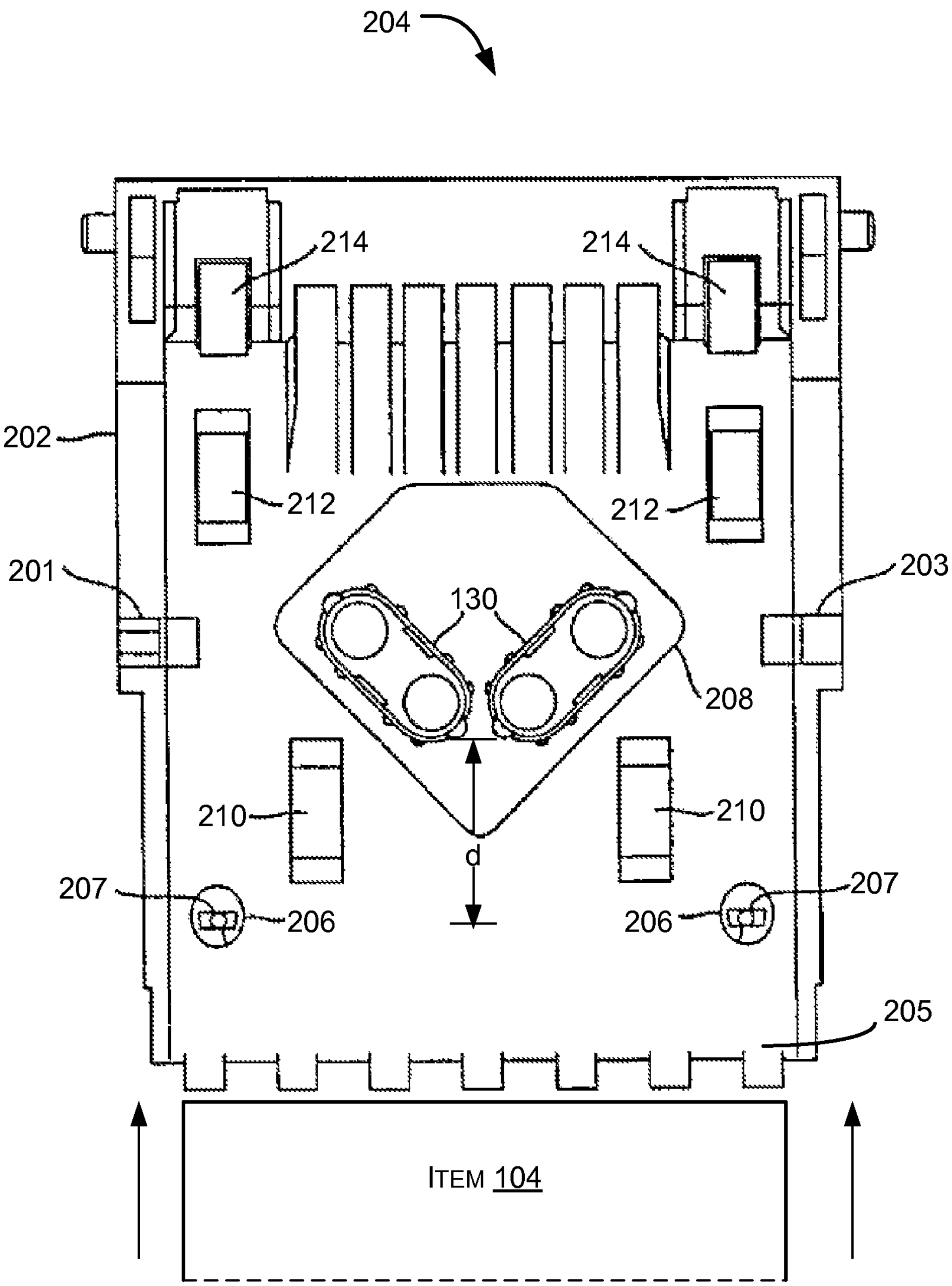
FIG. 2 is a top view of top surface of a lower housing of a validation portion of the sensing system, such as a banknote validator, according to an example implementation of the present subject matter.

FIG. 2 is a top view of top surface of a lower housing 202 of a validation portion 204 of the sensing system 100, such as a banknote validator, according to an example implementation of the present subject matter. FIG. 3 is a top view of a bottom surface of an upper housing 302 of the validation portion 204 of the sensing system 100, according to an implementation of the present subject matter. Lower housing 202 and upper housing 302 define an entry 205 (as well as a transport path) for item 104, inserted in a direction shown by arrows.

Figure 3:
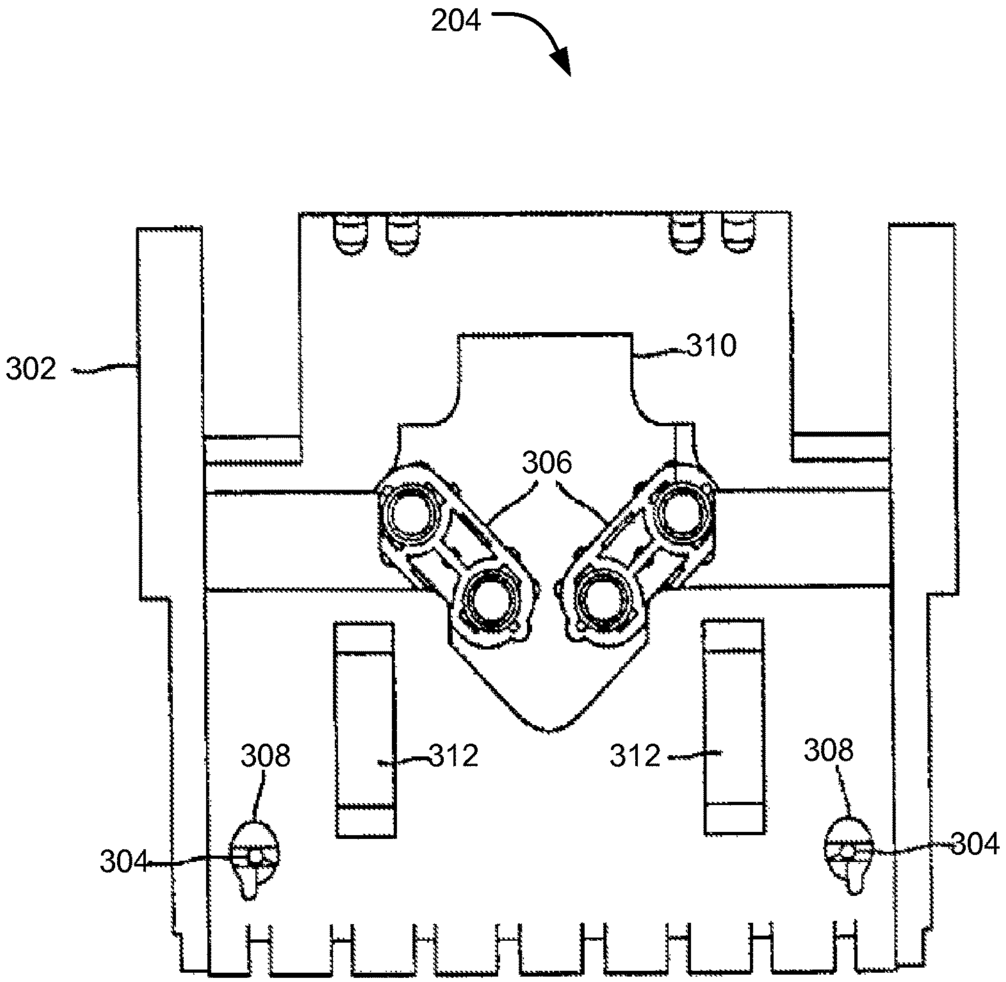
FIG. 3 is a top view of a bottom surface of an upper housing of the validation portion of the sensing system, according to an implementation of the present subject matter.

With reference to FIGS. 2 and 3, lower housing 202 and upper housing 302 include sensors 102, such as start sensors 128 and recognition sensors 130. Each of the sensors 102 can include at least one light emitting source, for example a light emitting diode, and at least one light detector, for example a phototransistor. For example, start sensor 128 includes light sources 207 and light detectors 304. In one implementation, light sources 207 and light detectors 304 are on opposite sides of the inserted item 104 thus forming a cross channel start sensor 128. In another implementation, light sources 207 and light detectors 304 are on the same side of the item 104, either both on the lower housing 202 or upper housing 302. It will be understood that other implementations are possible without departing from the spirit or scope of the present subject matter. Similarly, recognition sensors 130 may include light sources and detectors 306 as well. For the sake of clarity, the light sources in recognition sensors 130 are marked as recognition sensors 130.

Further, sensors 102 can have a multi-pellet configuration, emitting light at two or more different wavelengths, such as red and infrared, or can emit light at a single wavelength. The lower housing 202 can also include first prism 201 and second prism 203 to detect string, tape, or other foreign objects attached to the item 104.

Light sources of start sensors 128 and recognition sensors 130 are covered by windows 206 and windows 208 respectively to allow light to pass through the lower housing 202 across the banknote path. Light sources 207 of start sensors 128, in one implementation, are placed just within the banknote entry 205, prior to a first set of rollers 210.

As mentioned above, the upper housing 302 includes light detectors 304 and 306 corresponding to the light sources 207 of start sensors 128 and recognition sensors 130, respectively. Similar to windows 206, windows 308 and 310 allow light to pass through housing 302 to detectors 304 and 306 respectively.

The incoming item 104, engaged between a second set of rollers 312 and the first set of rollers 210, is conveyed past sensors 102. The item 104 is then advanced to a third and fourth set of rollers 212 and 214. Generally, the rollers and transport path are mechanically designed to facilitate forward motion, i.e., motion of items 104 from an input to the units (e.g. storage units) coupled to the sensing system 100. The reverse motion, i.e., motion towards the input when rejecting non-banknote items 104, such as credit cards, is typically not designed to handle high rejection rates. To this end, the implementations described herein provide an early detection of non-item 104, such as non-banknote item, before the non-banknote item goes far into the sensing system 100. This is described in detail in subsequent paragraphs.

Referring to FIGS. 1, 2 and 3, when light from one or both light sources 207 of the start sensors 128 is blocked by an inserted item 104, sampling module 116 activates a motor (not shown) to turn on the first set of rollers 210 and convey item 104 in a forward direction (shown by arrows). As the item 104 progresses forward with the help of motor, the sampling module 116 defines a sampling interval. The sampling module 116 samples the start sensors 128 based on the sampling interval. In an example, the sampling interval is defined at least by the speed of motor. Data obtained from each sample is stored as start sensor data 122. Additionally, as item 104 moves forward towards recognition sensors 130, sampling module 116 increments the sample count with the lapse of each sample. Sampling module 116 also determines a total number of samples, hereinafter referred to as the maximum sample count, and stores the value in other data 126. Further, sampling module 116 may collect start sensor data 122 until the sample count is equal to the maximum sample count.

Thus, at each sampling count, a pair of start sensor data 122 is obtained corresponding to each of the start sensors 128. It will be understood that presence of start sensor data indicates that item 104 covers, at least in part, the corresponding start sensor 128. On the contrary, absence of start sensor data 122 indicates that the item 104 does not cover the corresponding start sensor 128.

In an implementation, tracking module 118 analyzes start sensor data 122, for example in real-time, after obtaining at least one reading of start sensor data 122. Tracking module 118 further determines whether start sensor data 122 is absent and increments a variable referred to as absence count based on the determination. The absence count is stored in other data 126. Tracking module 118 can also determine if the absence count is more than a predetermined number, hereinafter referred to as the threshold absence count. The threshold absence count depends on distance "d" between the start sensors 128 and recognition sensors 130, speed of motor, specification of start sensors 128, etc.

In an implementation, if tracking module 118 determines that absence count is more than the threshold absence count, tracking module 118 can indicate that a non-banknote item has been received. Examples of non-banknote items that can increment the threshold absence count include, but not limited to, credit cards, debit card, tickets, receipts, or in general any item that is dimensionally different from an acceptable banknote. In an example scenario, a non-banknote item, for example a credit card, is narrower in width than a banknote and therefore misses the start sensors 128 a number of times, making the absence count higher than the threshold absence count over the first few samples.

Additionally or alternatively, in another implementation, tracking module 118 can also check the sample count to determine if it is below a predefined threshold sample count, in addition to determining whether the absence count is more than the threshold absence count. Accordingly, tracking module 118 ascertains that a non-banknote item 104 has been inserted.

In an implementation, similar to start sensors 128, the sampling module 116 also samples one or more recognition sensors 130, in response to the inserted item 104, at predefined sampling intervals. The sampling intervals are defined by the sampling module 116. The sampling of the recognition sensors 130 yields data, which is then captured and stored as and into recognition sensor data 124. As mentioned before, recognition sensors 130 capture recognition sensor data 124 pertaining to the validity of the item 104 as a valid banknote. It will be understood that due to the separation between start sensors 128 and recognition sensors 130, start sensors 128 are sampled until item 104 reaches the recognition sensors 130. After item 104 has covered the distance between start sensors 128 and recognition sensors 130, both sensors 128 and 130 are sampled.

In an implementation, tracking module 118 continues to monitor start sensor data 122 and compare the start sensor data 122 with the threshold absence count. Tracking module

118 initiates a rejection process the moment the comparison yields that start sensor 128 has been uncovered more times than defined by the threshold absence count. Accordingly, tracking module 118 returns inserted non-banknote item 104 to user via rollers 210 and 312.

In an implementation, recognition sensors 130 and start sensors 128 continue capturing data if a rejection is not initiated and process the collected start sensor data 122 and recognition sensor data 124 to determine whether or not item 104 is a valid-banknote. If item 104 is determined to be a valid-banknote, item 104 is sent to the associated unit, for example recycler, storage unit, etc., (not shown) via rollers 212 and 214. However, if item 104 is deemed suspect counterfeit-banknote, item 104 is returned back to the user.

In this manner, the tracking module 118 can initiate an early rejection of a non-banknote item 104 thus avoiding collection of additional data by recognition sensors 130 at a later stage. This helps reduce time required for analysis and rejection problems, such as jamming. Also, early detection of non-banknote item 104 helps reject the item 104 well before it has been "eaten" by the sensing system 100, allowing the user to pull the item 104 out without operator assistance. Empirical results show that there is a higher likelihood of getting early rejection with non-banknote items 104, such as credit cards, than banknotes with cut outs or ragged edges. In an example, the threshold absence count is set to 5 and threshold sample count is set to 10. However, different values can be used without departing from the spirit and scope of the present subject matter.

Figure 4:
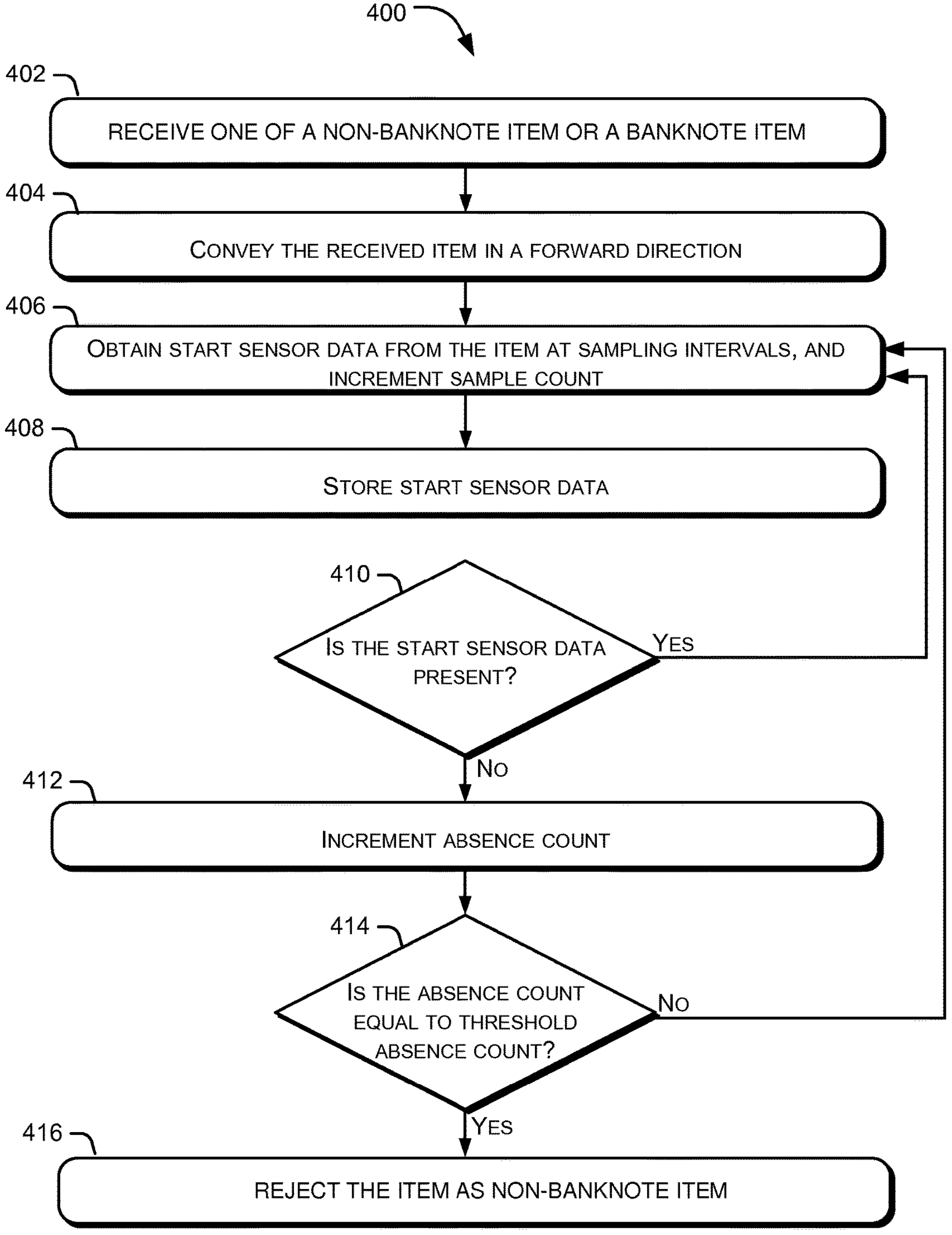
FIG. 4 illustrates an exemplary method for differentiating non-banknote items from banknotes, in accordance with an embodiment of the present subject matter.

FIG. 4 illustrates an exemplary method 400 for differentiating non-banknote items from banknotes, in accordance with an embodiment of the present subject matter. Method 400 is described in the context of banknotes or bills; however, method 400 may be extended to cover other kinds of items as well. Herein, some implementations are also intended to cover program storage devices, for example, digital data storage media, which are machine or computer readable and encode machine-executable or computer-executable programs of instructions, wherein said instructions perform some or all of the steps of the described method. The program storage devices may be, for example, digital memories, magnetic storage media such as a magnetic disks and magnetic tapes, hard drives, or optically readable digital data storage media.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 402, an item is received. For example, item 104 can be banknote or a non-banknote item. Examples of non-banknote items include, but are not limited to, credit cards, debit cards, loyalty cards, bank cards, membership cards, identification cards, tickets, receipts, security papers, checks, coupons, or in general any document that is dimensionally different from a banknote or bill.

At block 404, the item is conveyed in a forward direction. In an implementation, received item 104 is conveyed in forward direction (as shown in FIG. 2) with the help of mechanical elements, such as rollers 210 and motor (not shown). The speed of the motor is controlled by sampling module 116.

At block 406, start sensor data 122 is obtained at predetermined sampling intervals. In an implementation, as item 104 progresses forward, start sensors 128 are sampled at predetermined sampling intervals to capture start sensor data 122. In an implementation, the sampling interval is based at least on the speed of motor. Additionally, sampling module 116 increments the sample count with each sample.

At block 408, start sensor data 122 is stored for further analysis.

At block 410, it is determined whether start sensor data 122 is present. In an implementation, if tracking module 118 determines that start sensor data 122 is present ("Yes" branch at block 410), transition is re-directed to block 406. However, if tracking module 118 determines start sensor data 122 is absent ("No" branch at block 410), tracking module 118 increments an absence count at block 412. The presence of start sensor data 122 indicates that start sensors 128 are covered, however absence of start sensor data 122 indicates that start sensors 128 are not covered, possibly because the item 104 is not of the same dimension as a banknote.

At block 414, absence count is compared with a threshold absence count. In one implementation, if the absence count is determined to be equal or more than the threshold absence count ("Yes" branch at block 414), the item is rejected at block 416 as non-banknote item. However, if the determination yields that the absence count is less than the threshold absence count ("No" branch at block 414), the start sensor data 122 is obtained until the sample count reaches a maximum value. The sample count may reach a maximum value when the item 104 has passed through all the sensors 102. The start sensor data 122 stored can then be evaluated to determine whether the banknote is genuine or suspect counterfeit. Accordingly, the banknote is either returned to the user or sent to units within the sensing system 100.

Figure 5:
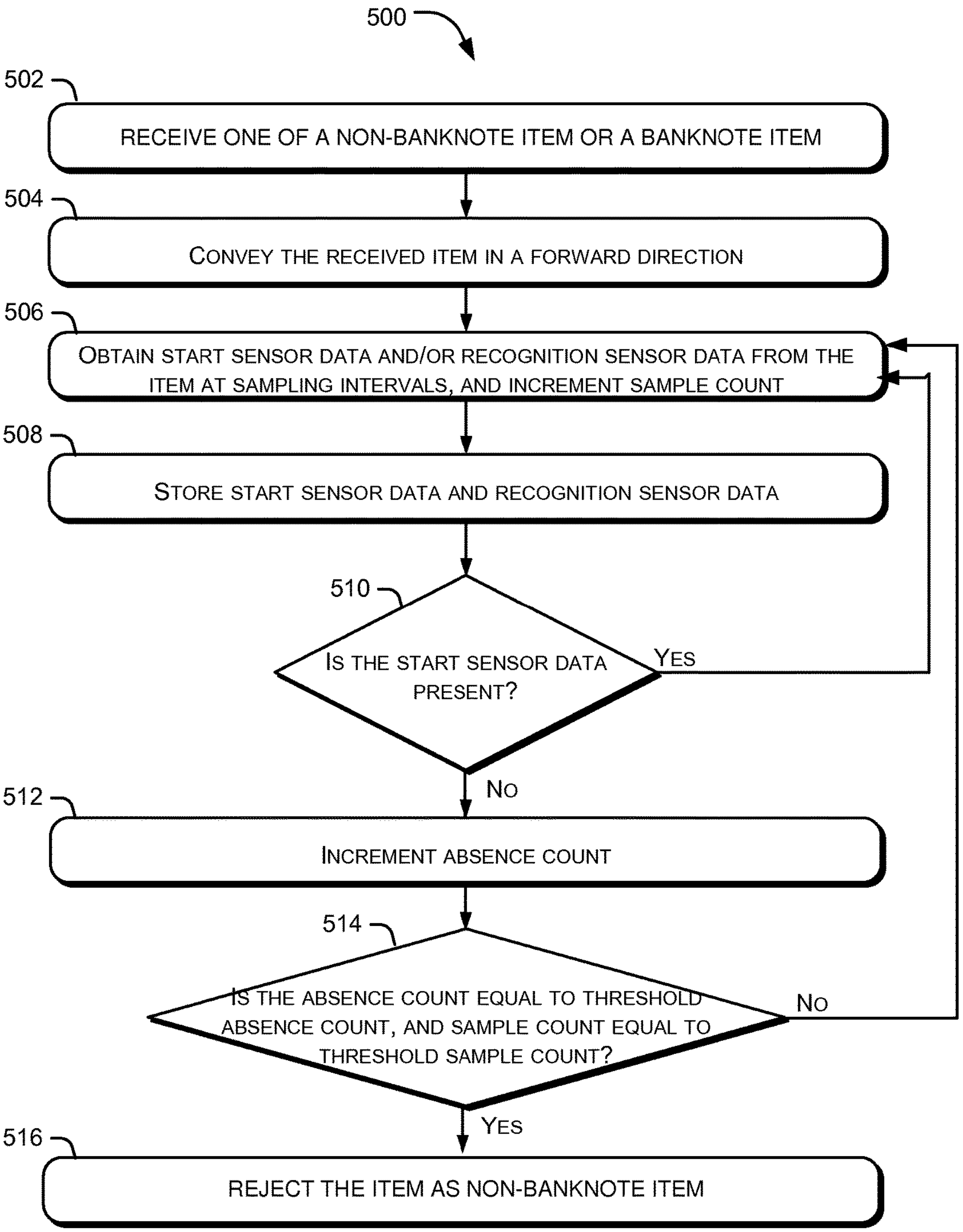
FIG. 5 illustrates an exemplary method for differentiating non-banknote items from banknotes, in accordance with another embodiment of the present subject matter.

FIG. 5 illustrates an exemplary method 500 for differentiating non-banknote items from banknotes, in accordance with another embodiment of the present subject matter. Method 500 is described in the context of banknotes or bills; however, method 500 may be extended to cover other kinds of items as well. Herein, some embodiments are also intended to cover program storage devices, for example, digital data storage media, which are machine or computer readable and encode machine-executable or computer-executable programs of instructions, wherein said instructions perform some or all of the steps of the described method. The program storage devices may be, for example, digital memories, magnetic storage media such as a magnetic disks and magnetic tapes, hard drives, or optically readable digital data storage media.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 502, an item is received. For example, the item 104 can be a banknote or a non-banknote item, such as credit card or token.

At block 504, the item is conveyed in a forward direction. In an implementation, the received item 104 is conveyed in forward direction (as shown in FIG. 2) with the help of mechanical elements, such as rollers 210 and motor (not shown). The speed of the motor is controlled by sampling module 116.

At block 506, start sensor data 122 and/or recognition sensor data 124 is obtained at predetermined sampling intervals. In one implementation, as the item 104 progresses forward, start sensors 128 capture start sensor data 122 and recognition sensor data 124 at predetermined sampling intervals. In one implementation, the sampling interval is based at least on the speed of motor. Additionally, sampling module 116 increments sample count with each sample from start sensors 128.

At block 508, start sensor data 122 and recognition sensor data 124 is stored.

At block 510, it is determined whether start sensor data 122 is present. In one implementation, if tracking module 118 determines that start sensor data 122 is present ("Yes" branch at block 510), transition is re-directed to block 506. However, if tracking module 118 determines start sensor data 122 is not present, ("No" branch at block 510), tracking module 118 increments an absence count at block 512. The presence of start sensor data 122 indicates that start sensors 128 are covered; however unavailability or absence of start sensor data 122 indicates that start sensors 128 are not covered, possibly because the item 104 is not of the same dimension as a banknote. Additionally, this helps in an early detection of a non-banknote item that can jam the sensing system 100.

At block 514, absence count is compared with a threshold absence count. Additionally, the sample count is compared with a threshold sample count. In one implementation, if the absence count is determined to be equal or more than the threshold absence count and sample count is equal to a threshold sample count ("Yes" branch), the item is rejected at block 516 as non-banknote item. However, if the determination yields that the absence count is less than the threshold absence count ("No" branch), transition returns to block 506 where the start sensor data 122 is obtained until the sample count reaches a maximum value. The sample count may reach a maximum sample count when the item 104 has passed through all the sensors 102. The start sensor data 122 stored can then be evaluated to determine whether the banknote is genuine or suspect counterfeit. Accordingly, the banknote is either returned to the user or sent to units within the sensing system 100.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

Although embodiments for a system to detect non-banknote items have been described in language specific to structural features and/or methods, it is to be understood that the invention is not necessarily limited to the specific features or methods described. Rather, the specific features and methods are disclosed as exemplary embodiments for the system to detect non-banknote items.

What is claimed is:

1. A sensing system comprising:
- a plurality of sensors including at least one start sensor and at least one recognition sensor, wherein the at least one start sensor of the plurality of sensors is configured to emit light from a light source across a transport path to a light detector, and wherein the at least one recognition sensor is configured to capture recognition sensor data related to material properties of an inserted item to determine whether the inserted item is a valid banknote;
- a sampling module configured to:
  - identify a sampling interval; and
  - sample the start sensor based on the sampling interval to obtain start sensor data; and
- a tracking module configured to:
  - responsive to identifying that the start sensor data is absent for a sample at the sampling interval, increment an absence count, wherein the start sensor data is absent when the light source is uncovered;
  - compare the absence count with a threshold absence count; and
  - reject the inserted item based at least on a result of the comparison prior to the determination whether the inserted item is the valid banknote based on the recognition sensor data.

2. The sensing system as claimed in claim 1, wherein the tracking module is further configured to compare a sample count to a threshold sample count, and reject the inserted item if the sample count exceeds the threshold sample count.

3. The sensing system as claimed in claim 1, wherein the tracking module is configured to obtain recognition sensor data from the recognition sensors.

4. The sensing system as claimed in claim 3, wherein the tracking module determines whether the inserted item is a valid banknote based at least on the recognition sensor data.

5. The sensing system as claimed in claim 1, wherein the rejected item is at least one of a credit card, a debit card, a loyalty card, a bank card, a membership card, an identification card, a ticket, a receipt, a voucher, a security document, a check, and a coupon, and wherein the rejected item is dimensionally smaller than a banknote.

6. The sensing system as claimed in claim 1, wherein the sensing system is implemented in one of a vending machine, an automatic teller machine, a gaming machine, a currency validator, and a banknote validator.

7. A method comprising:
- receiving an item into an electronic transaction system that includes processing circuitry, wherein the item is at least one of a non-banknote item and a banknote;
- identifying, by the processing circuitry, a predetermined sampling interval;
- sampling, by the processing circuitry, a start sensor based on the predetermined sampling interval to obtain start sensor data;

responsive to identifying that the start sensor data is absent for a sample at the predetermined sampling interval, incrementing, by the processing circuitry, an absence count, wherein the start sensor data is absent when a light source of the start sensor is uncovered;

comparing, by the processing circuitry, the absence count with a threshold absent count; and rejecting the item as a non-banknote item based at least on a result of the comparison prior to a determination whether the item is a valid banknote based on recognition sensor data, from at least one recognition, sensor related to material propertied of the item.

8. The method as claimed in claim 7, wherein comparing the absence count further comprising, comparing a sample count to a threshold sample count, and reject the item if the sample count exceeds the threshold sample count.

9. The method as claimed in claim 7 further comprising obtaining recognition sensor data from at least one recognition sensor by sampling the recognition sensor at the predetermined sampling intervals.

10. The method as claimed in claim 7, wherein the non-banknote item is at least one of a credit card, a debit card, a loyalty card, a bank card, a membership card, an identification card, a ticket, a receipt, a voucher, a security document, a check, and a coupon, and wherein the rejected item is dimensionally smaller than a banknote.

11. The method as claimed in claim 7 further comprising:

incrementing a sample count, if at least one of the start sensors and recognition sensors are sampled; and comparing the sample count with a threshold sample count; and rejecting the item based at least on the comparing.

12. The method as claimed in claim 7, wherein the method is implemented in one of a vending machine, an automatic teller machine, a gaming machine, a currency validator, a pay phone, a computer, and a hand-held device.

13. The method as claimed in claim 7, wherein the threshold absence count is five.

14. The method as claimed in claim 11, wherein the threshold sample count is ten.

15. A method comprising:

identifying, by processing circuitry for use with an electronic transaction system, a sampling interval;

sampling, by the processing circuitry, a start sensor based on the sampling interval to obtain start sensor data in response to an item inserted into electronic transaction system;

analyzing, by the processing circuitry, a predetermined number of samples to determine whether the start sensor data is absent in the predetermined number of samples;

responsive to identifying that the start sensor data is absent for a sample at the sampling interval, increment an absence count, wherein the start sensor data is absent when a light source of the start sensor is uncovered;

comparing, by the processing circuitry, the absence count with a predetermined value; and detecting the inserted item based on a result of the comparison prior to a determination whether the inserted item is a valid banknote based on recognition sensor data, from at least one recognition sensor, related to material properties of the item.

16. The method as claimed in claim 15, wherein the predetermined number of samples is ten.

17. The method as claimed in claim 15, wherein the predetermined value is five.

18. The method as claimed in claim 15, wherein detecting further comprises rejecting the inserted item as an unacceptable item.

19. The sensing system as claimed in claim 1, wherein rejecting the inserted item based on the comparison prevent the inserted item from reaching the recognition sensor.

* * * * *